F. MARION.
INTERNAL COMBUSTION ENGINE.
APPLICATION FILED MAY 16, 1917.
1,281,621.
Patented Oct. 15, 1918.
6 SHEETS—SHEET 2.
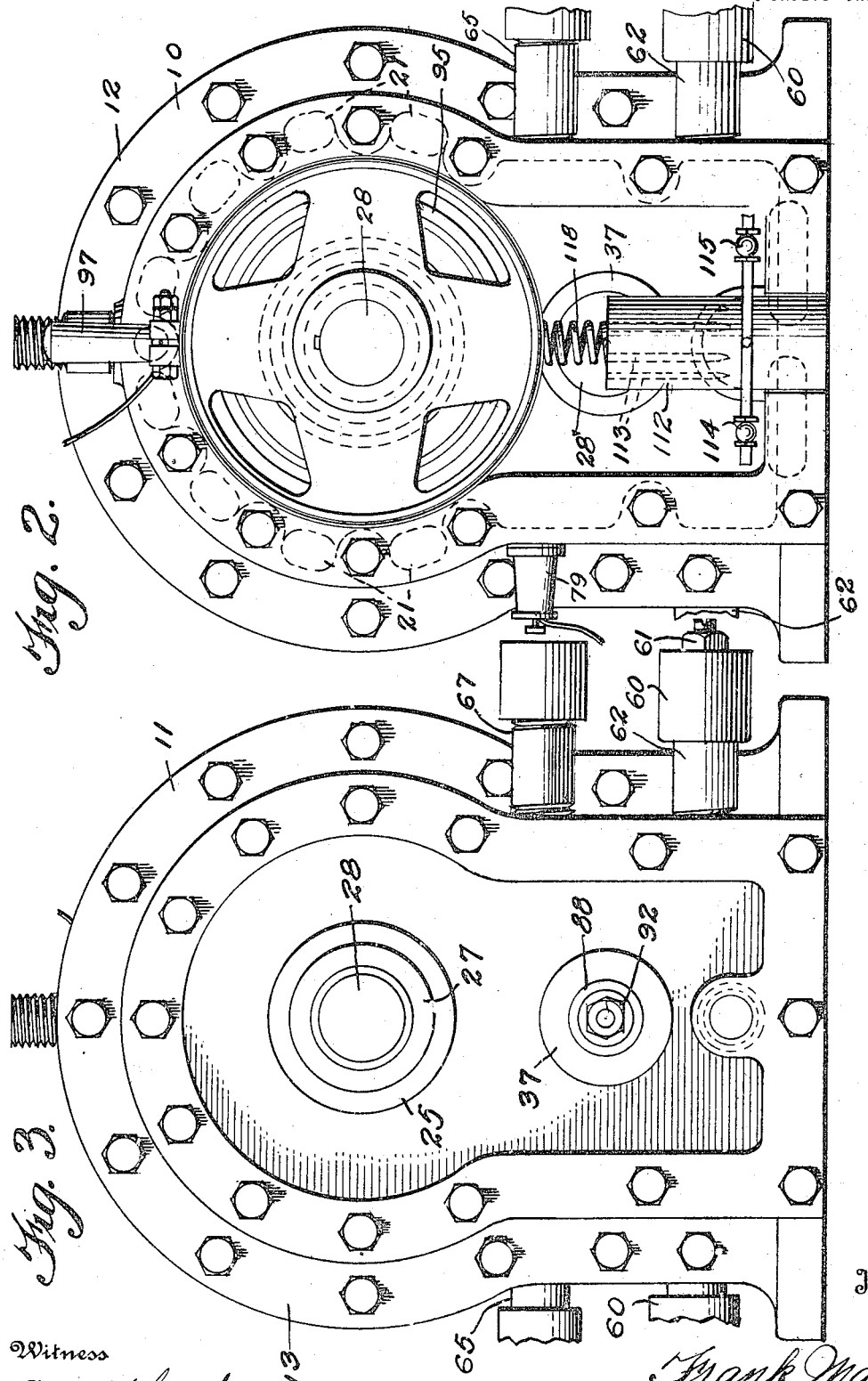

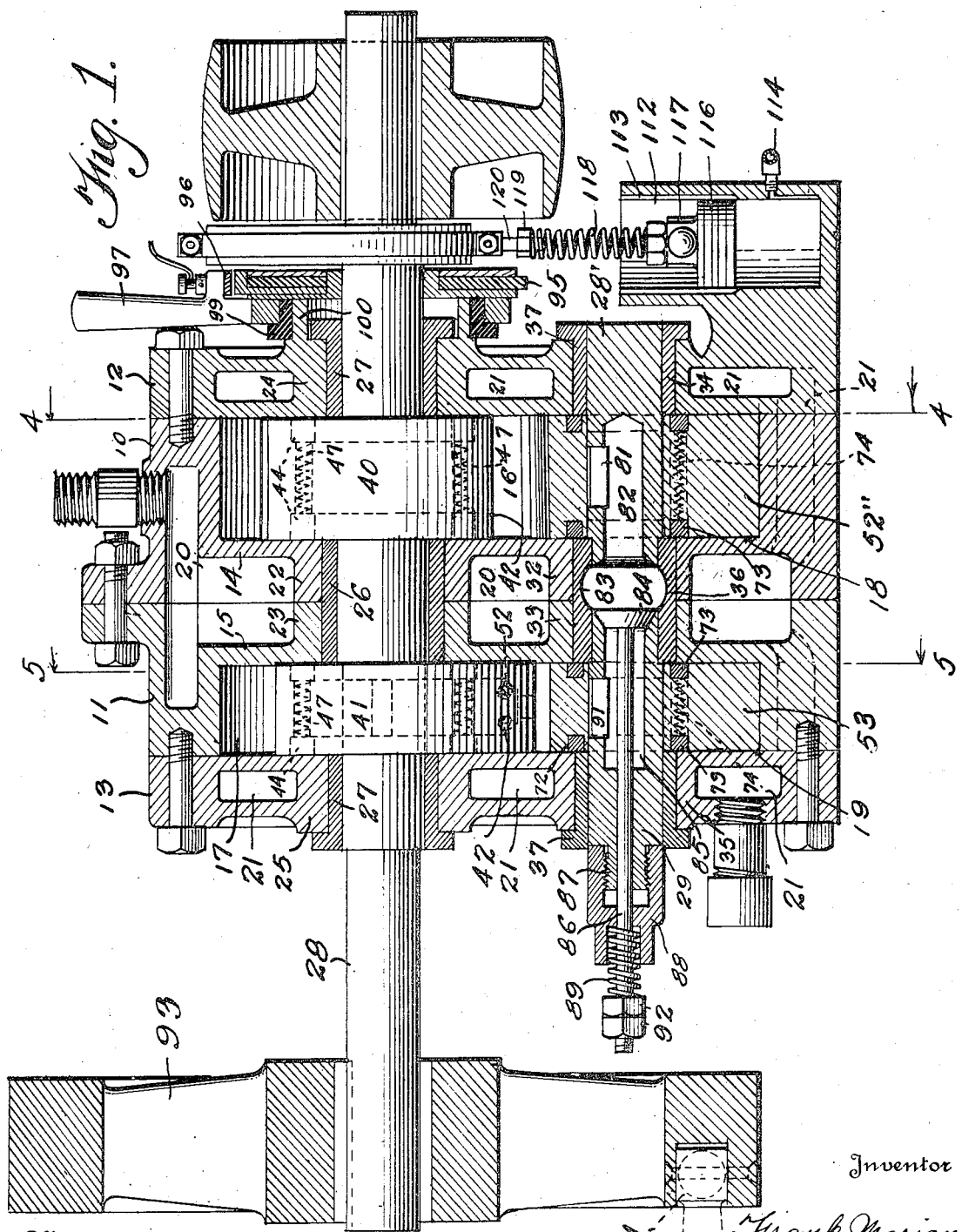

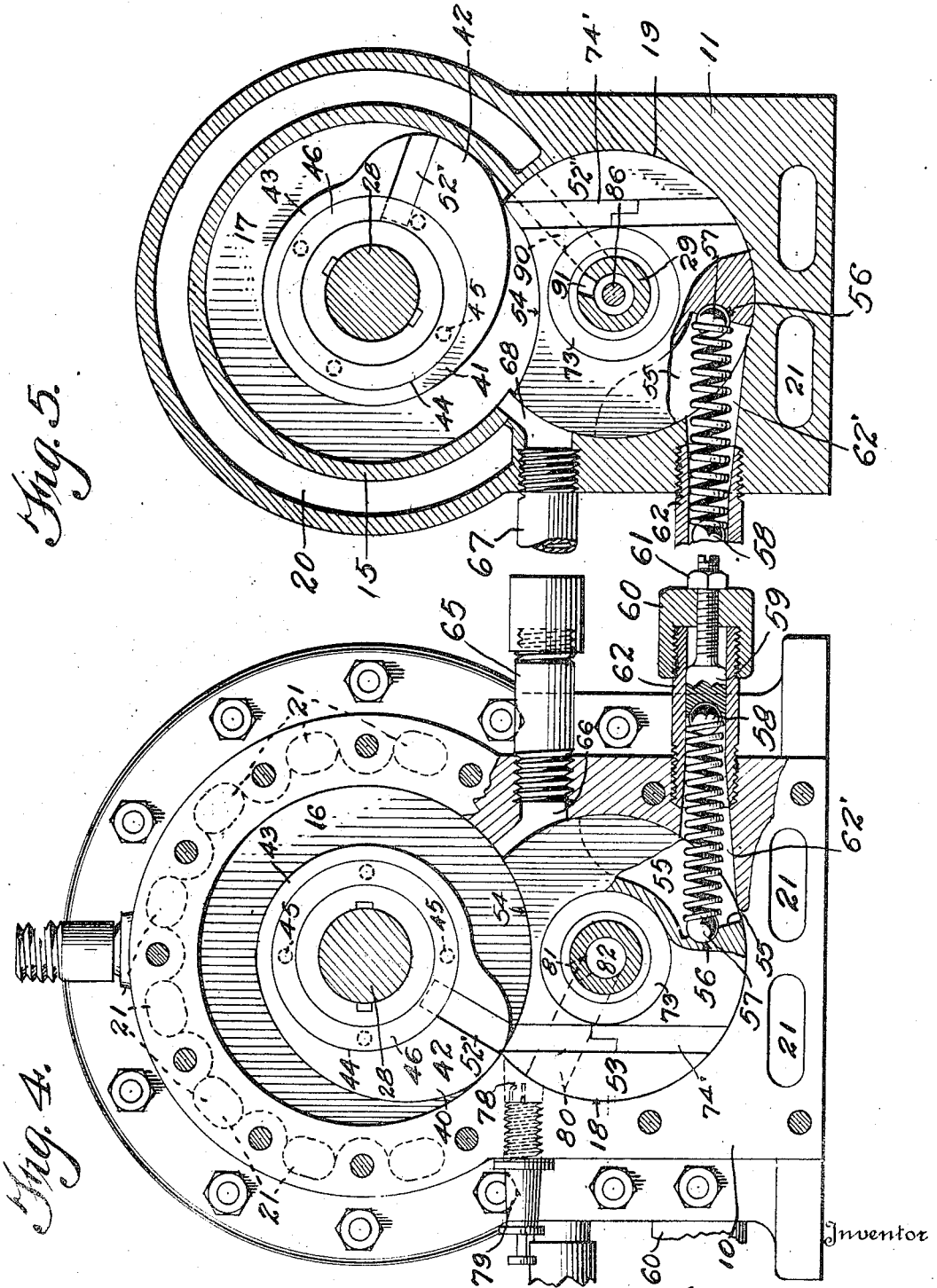

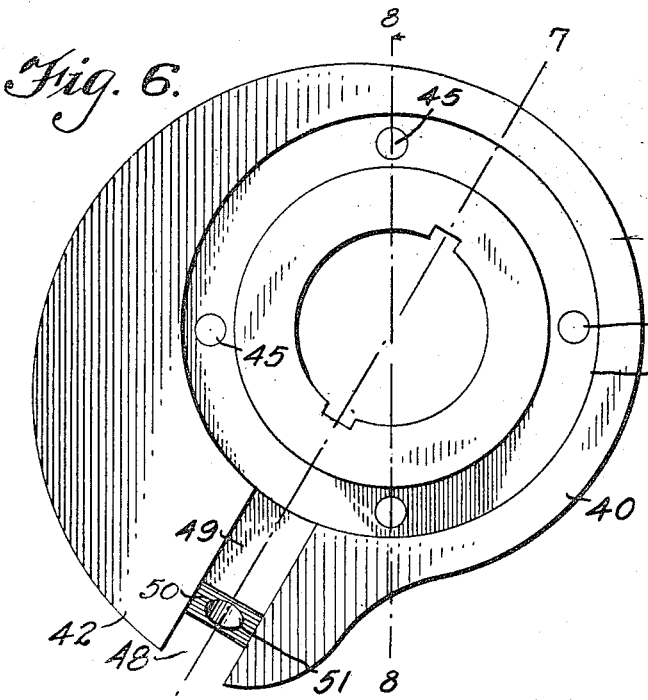
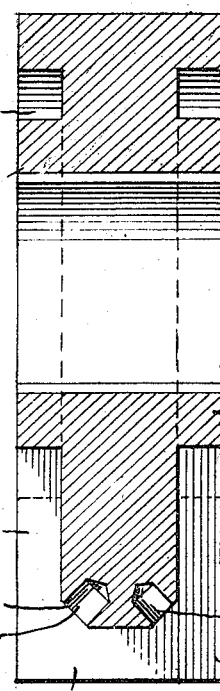
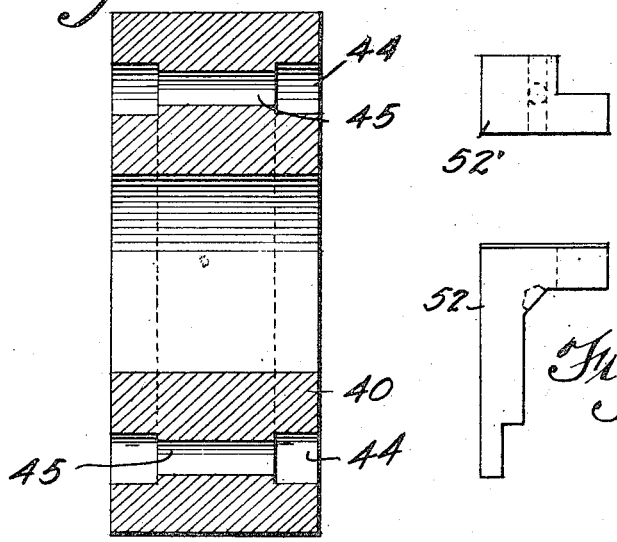

F. MARION.
INTERNAL COMBUSTION ENGINE.
APPLICATION FILED MAY 16, 1917.
1,281,621.
Patented Oct. 15, 1918.
6 SHEETS—SHEET 5.
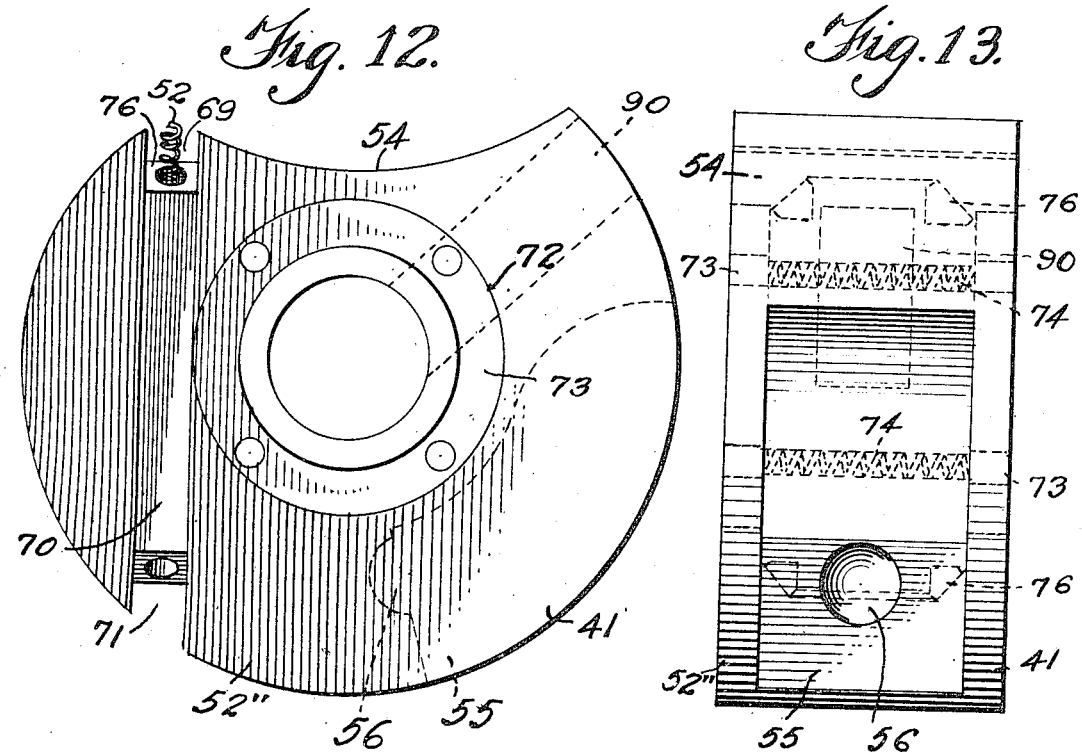
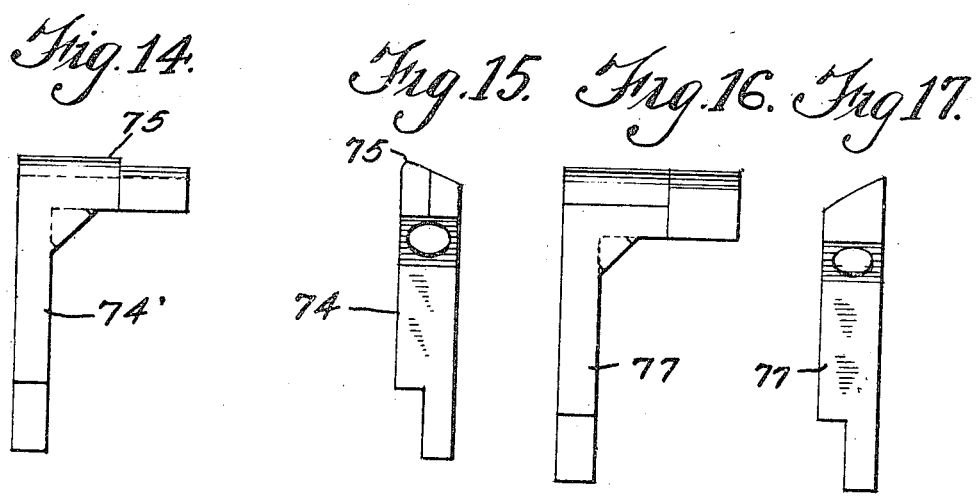
Witness
J. R. Hardy
Chr. Nielsen, Jr.
Inventor
Frank Marion
By H. L. Woodward
Attorney

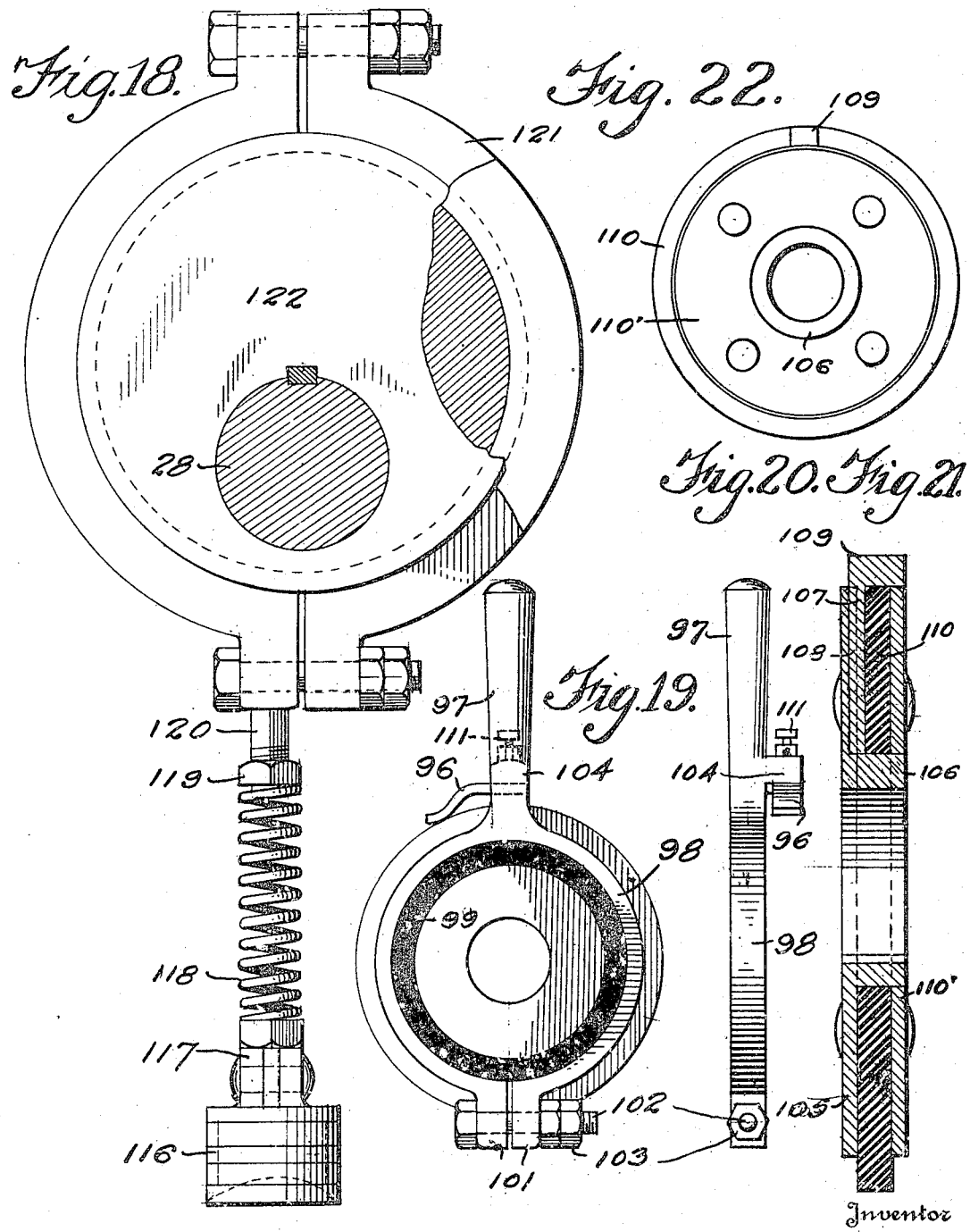

UNITED STATES PATENT OFFICE.

FRANK MARION, OF HARDWICK, VERMONT, ASSIGNOR, BY DIRECT AND MESNE ASSIGNMENTS, TO THE MARION ROTARY MOTORS COMPANY, INC., OF HARDWICK, VERMONT, A CORPORATION OF VERMONT.

INTERNAL-COMBUSTION ENGINE.

1,281,621.  Specification of Letters Patent.  Patented Oct. 15, 1918.

Application filed May 16, 1917.  Serial No. 169,035.

*To all whom it may concern:*

Be it known that I, FRANK MARION, a citizen of the United States, residing at Hardwick, in the county of Caledonia and State of Vermont, have invented certain new and useful Improvements in Internal-Combustion Engines, of which the following is a specification.

This invention relates to improvements in internal combustion engines, and has for an object to provide efficient construction and arrangement of parts for such machines. It is an important aim to present an improved means for controlling the operation of such machines, and to also provide a machine which may be readily constructed without difficulty in order to attain the ends in view, lessening the cost for machine work as far as possible, and facilitating the handling and assembly of the machine. A further important aim is to give an improved construction in the valve device between a compressor and engine such as illustrated in my prior patent, dated March 20, 1917, #1,219,829; an improved mounting for the spring engaged with the oscillating abutment. A further aim is to provide for the satisfactory lubrication of such engines in an efficient manner.

Additional objects, advantages, and features of invention will appear from the construction, arrangement and combination of parts hereinafter set forth and shown in the drawings, wherein, Figure 1 is a longitudinal sectional view of the engine, Fig. 2 is a front elevation thereof, Fig. 3 is a rear elevation, Fig. 4 is a front view showing the front plate of the casing removed, Fig. 5 is a sectional view in the compressor, looking the same direction as in Fig. 4, Fig. 6 is a detail side elevation of the engine piston, Fig. 7 is a sectional view thereof on the line 7—7 of Fig. 6, Fig. 8 is a similar view on the line 8—8 of Fig. 6, Fig. 9 is a detail top view of the packing elements, for the piston, Fig. 10 is a side elevation thereof, Fig. 11 is an inner edge view thereof, Fig. 12 is a side elevation of the abutment with the packing element removed, Fig. 13 is a right lateral elevation thereof, Fig. 14 is a detail side view of one of the upper packing elements for the abutment, Fig. 15 is an inner edge elevation thereof, Fig. 16 is a side elevation of one of the lower packing elements for the abutment, Fig. 17 is an inner edge view thereof, Fig. 18 is an elevational view of the pump piston the spring connecting rod therefor, and the eccentric connections on the engine shaft for operating the pump.

Fig. 19 is an elevational view of the timer lever,

Fig. 20 is an edge view thereof,

Fig. 21 is an enlarged vertical diametrical sectional view of the commutator element, Fig. 22 is a front view of the commutator element.

There is illustrated an engine comprising a casing element formed in two parts, 10 and 11, similar in cross section, and having front and rear head plates 12 and 13 secured thereto, the sections 10 and 11 being formed with inner head portions 14 and 15 disposed adjacent each other, the casings being alined and snugly fitted to each other, as will be described in greater detail. The casing sections 10 and 11 are each formed with an upper enlarged cylinder portion 16 and 17 respectively, which will be termed the piston chambers of the engine and compressor, respectively, and the smaller cylindrical chamber portions 18 and 19, which will be termed abutment chambers. The piston and abutment chambers in both the sections 10 and 11 are of the same diameter, like chambers in each section being on a common axis. The axes of the piston and abutment chambers are spaced a distance less than the sum of their radii, so that the perimetal wall of the abutment chamber extends only over an arc of approximately 270 degrees. The sections 10 and 11 of the casings are recessed at their abutting portions to form the water passages 20, and the heads 12 and 13 are suitably cored to provide extension of these passages having communication therewith as at 21. The sections 10 and 11, and the plates 12 and 13 are formed with upper bearing sleeves 22, 23, 24, and 25 respectively, in which bushings 26 and 27 are fitted for the engine shaft 28, which is extended commonly therethrough. A single bushing 26 is extended through the sleeves 22, and 23 of the abutting sections 10 and 11. The sleeves mentioned are of course concentric with the chambers 16 and 17. Similar sleeve portions 32, 33, 34, and 35 corresponding to those first mentioned are formed in the lower parts of the casing elements, concentrically with the chambers 18 and 19, in which bushings 36 and 37 are driven, and into which abutment shafts 28' and 29 are driven, at the front and rear of the engine, as shown. Secured upon the shaft 28 in the chambers 16 and 17, there are engine and compressor pistons 40—41, respectively, having head portions 42 of similar form, the head portion of the piston 40 being advanced in the direction of normal rotation of the device a distance, corresponding to the difference in position of the two pistons as illustrated in Figs. 4 and 5, wherein the views are presumed to have been taken with the engine parts in the same position in each instance, and the direction of the two views being the same. The piston includes a body portion 43 concentric with the shaft 28, to which the piston is suitably keyed, while the head portions 42 have an advanced face in the form of a lateral projection of a parabolic curve, extending approximately over an arc of in the neighborhood of one hundred and twenty degrees, its inner and outer parts being coincident as nearly as possible with the perimeter of the portion 43 of the piston, and the outermost portion of the piston, which is concentric with the shaft 28. The rear faces of the head 42 extends abruptly outwardly from the portion 43 to the outer part of the head 42, but curved sufficiently to avoid angles, and to permit proper functioning of the abutment to be subsequently described. In the lateral faces of the pistons, an annular recess 44 is formed, concentric with the shaft and spaced a short distance outwardly therefrom, in which recesses at intervals there are small spring receiving passages 45, extending from the recess 44 on one side to the corresponding recess on the opposite side of the piston. In the annular recesses there are snugly but loosely fitted rings 46, and confined between the rings of each piston there are springs 47, disposed in the passages 45. Across the outer face of the piston at the point of its maximum radius, a transverse groove 48 is formed, having parallel sides, and radial extensions 49 of this groove are formed on each side of the piston, of the same depth as the annular recesses 44 before mentioned, with which they communicate. The bottoms of the grooves 48 and 49 are beveled at their junctions to form the diagonal face 50, in which a small spring receiving recess 51 is formed, having therein a small helical spring 52, bearing outwardly upon a packing block 52', one block being disposed at each side of the piston, the blocks being L-shaped, and having mortised slidably overlapped arms disposed across the outer face of the piston, the other arms of the blocks being extended into the recess 44 there adjacent, and cut away on their outer side to receive portions of the rings before mentioned, which are also recessed suitably to receive the ends of the blocks. In this manner the piston is effectively packed in the chamber, and leakage passing the rings and the blocks reduced to a minimum. The blocks will automatically accommodate themselves to the casing to compensate for wear or irregularity in the walls of the cylinder.

In the abutment chambers there are located abutments 52"—53, respectively. Each of these is approximately in the form of a disk having a portion cut away forming a recess 54 at their upper sides, substantially in the form of a continuation of the wall of the chambers 16 and 17, respectively. These abutments are recessed also adjacent their lower sides, providing a radial face 55, having a semi-spherical socket 56 therein, receiving a ball 57, against which bears a helical spring, the terminal coil of which is smaller than the diameter of the ball, the outer end of the spring being engaged against a similar ball 58 seated in the socketed head of an adjustment screw 59, carried in a cap nut 60, in which it is threaded and held by means of a lock nut 61. The screw 59 is provided with a slot at the outer end whereby it may be adjusted by means of a screw driver when the nut 61 is loosened. The cap nut 60 is engaged upon a nipple 62, threaded in the section 10 or 11, as the case may be. This nipple has a passage therein flared at the inner end, and the casing section also has an inwardly flared opening 62' forming a continuation of the passage in the nipple. This is in order to permit oscillation of the spring under movement of the abutment, as will be subsequently explained. The recesses in the abutments are extended so as to accommodate the springs under oscillation of the abutments, the abutments being shown in Figs. 4 and 5 at approximately one limit of their movement, while at the opposite limit of their movement the far edges of the recesses 54 opposite the respective springs are engaged with the lesser peripheries of the pistons. In the case of the motor section, the recess 54 of the piston and the springs are located at the right hand side, while in the compressor section those parts are located at the left hand side of the engine. The motor section has an exhaust connection 65 at the right hand side, in communication with a port 66, opening upon both the chamber 16 and the chamber 18 at the right hand side, while the compressor section has an inlet 67 communicating with an inlet port 68 opening upon the chamber 17 and 19 at the left hand side, in a similar relation. Each abutment on the portion opposite the recess 55 is formed with a packing groove 69 extending across the abutment just within the recess 54, while grooves 70 communicating therewith are formed on each side of the abutment, communicating with a transverse groove 71 on the outer periphery of the abutment. The grooves 70 are so located as to substantially coincide with a chord subtending an arc of about 90 degrees of the periphery of the abutment, and are spaced outwardly of the elements 28' and 29 upon which the abutment is revolubly mounted. In the sides of the abutment, annular grooves 72 are formed, lying inwardly of the grooves 70 and concentric with the abutment, in which packing rings 73 are loosely disposed, and borne outwardly by suitable springs 74 carried in passages extending from one side to the other of the abutments, and communicating with the respective grooves 72. Set in the grooves 69 and 70, there are L-shaped packing blocks 74', similar to those 52, before described, with the exception that their arms at the sides are not mortised for superposed relation in the same manner as the arms of the first described block are engaged with the rings 46. The blocks 74', upon the arms which extend into the grooves 69 are beveled upon their outer faces so as to form a continuation of the face of the recess 54, and at their extreme outer edges are rounded and extended to form a continuation of the periphery of the abutment, as shown at 75, thereby minimizing wear upon the piston. At the junction of the grooves 69, and 70, diagonal faces 76 are formed, suitably recessed to support springs by which the blocks 74 are borne outwardly. In the grooves 70 and 71 blocks 77 are engaged, the outer arms of which are suitably shaped to form a continuation of the peripheral surface of the abutment, the arms of the blocks 74' and 77 being mortised in slidable overlapped relation at each side of the abutment, and the blocks 75 are similarly overlapped in the recess 69, while the outer arms of the blocks 77 are similarly overlapped in the grooves 71.

At the left hand side of the engine section 10, a small pocket 78 is formed, in communication with the chamber 18, the pocket being continued to the exterior of the section 10 and internally threaded to receive the usual form of spark plug 79. The abutment 53 is formed with a large pocket 80, opening upon its periphery in such position that when the abutment is in what may be termed closed position, as indicated at Fig. 4, when the piston has borne the engaged side of the abutment to the outer limit of its movement with respect to the piston, the pocket 80 is in communication with the pocket 78. The shaft 28' upon which this abutment is mounted is provided with a port 81 opening from an axial passage 82 formed therein and opening upon the inner end of the shaft, the port being so located as to register with the pocket 80 at its inner part. The pocket is of such dimension at its inner part that communication will be maintained with the ports 81 throughout the oscillation of the abutment, and it should be noted that the pockets 80 open upon the periphery of the abutment outwardly of the grooves 69, 70, 71 with respect to the center of the abutment.

The abutment 52" is formed with a pocket 90, corresponding to the pocket 80, while the shaft elements 29 is formed with a port 91 corresponding to the port 81 before described, and having similar relation to the pocket in the abutment 52.

It should be noted that the shaft elements 28' and 29 stop short of each other at their inner ends, and that the bushing 36 is slightly enlarged on the interior at its central portion, as indicated at 83, whereby to accommodate for reciprocation a mushroom puppet valve 84, seating in the end of the shaft 29, which is provided with a coaxial passage 85 communicating with the port 91 before mentioned. The stem 86 of the valve 84 is mounted slidably in the outer end of the shaft 29, which is formed with an exteriorly threaded tenon 87, upon which there is screwed a packing gland 88, recessed at its outer part to receive a spring 89 engaged around the end of the stem 86 projecting outwardly therethrough, the outer end of the stem being threaded and having nuts 92 engaged thereon to hold the spring 89 compressed properly for seating of the valve 84, as will be understood.

The shaft 28 projects from the front and rear of the engine a suitable distance, being provided on one end with a fly wheel 93, of a familiar type, including a starting handle 94 adjustable thereon for use in starting the engine. For controlling the operation of the engine, a timing device is provided comprising a commutator proper 95, secured upon the shaft 28 adjacent the end opposite the fly wheel, coöperative with which there is a brush 96 carried by the lever 97 having an integral split collar portion 98 engaged revolubly around an insulator bushing 99 carried upon an annular flange 100 formed upon the plate 12 concentrically with the shaft 28. Ears 101 are formed at each side of the split in the collar 98, through which there is engaged a bolt 102 upon which nuts 103 are engaged by which the collar 98 may be clamped in position upon the bushing 99 for adjustment to compensate for wear. The brush 96 is secured upon a laterally projecting lug 104 formed upon the lever 97. It should be noted that the flange 100 is of a sufficient diameter to permit ready insertion of the bushing 27 in the plate 112, together with the bushing flange, which is accommodated within the flange 100. The commutator comprises a circular plate 105, having a hub portion 106 splined upon the shaft 28, the plate having a radial groove 107 at one point in which the stem 108 of the commutator segment 109 is fitted, the segment 109 having greater breadth than the shaft. A disk 110 of suitable insulating material is secured to the plate 105 its periphery being flush with the outer face of the segment 109, around which it is snugly fitted. The disk also receives a part of the stem 108 therein, as indicated in Fig. 21, and is held in place by a retaining plate 110' riveted to the plate 105. The commutator is connected in series with an electrical source and the primary of a spark coil or other ignition device in any approved manner, which will be readily understood by those versed in the art. A binding post 111 is provided upon the lever 97 for forming the necessary connections with the brush 96.

As there will be gases under pressure in both the engine and compressor section of the device most of the time, it is necessary to provide as a part of the engine a force feed oiling means, and for this purpose there is illustrated an integral pump cylinder 112 formed upon the plate 12 at its lower part, the cylinder extending vertically in line with the axis of the shaft 28. The cylinder is formed with a plurality of longitudinal grooves 113 therein, extending from the upper open end of the cylinder and stopping short of the bottom of the cylinder a predetermined distance. An oil inlet 114, and outlet 115 with suitable one way valves are indicated, with which suitable oil connections may be made. A reciprocating piston 116, of a familiar type is mounted in the cylinder, having a stem portion 117 upon which there is fixed in a suitable manner one end of a helical spring 118 serving the function of a piston rod, its upper end being connected to a nut 119 threaded upon a threaded bolt 120 forming part of a split collar 121, mounted revolubly upon the eccentric 122 which, in turn is keyed upon the shaft 28.

By this construction, necessity for pivotal connection between the piston and the eccentric is obviated, so that wear is minimized and objectionable rattle of pump connection done away with. The spring automatically permits the necessary relative movement in the eccentric and piston by its flexure, and also compensates for any lack of alinement of the pump and the plane of the eccentric. At the same time, what may be considered an even more important function is attained, consisting in the yielding of the spring when excessive resistance to compression in the cylinder 112 is encountered. This will be found useful where oil is supplied to an auxiliary reservoir from which it is fed to the bearings by some customary regulating means, there being various forms of such devices available, the action of which is readily understood. With my device, when the auxiliary reservoir is filled to a desired maximum pressure, the yielding of the pump piston will prevent further movement of oil to an objectionable extent.

With the parts constructed as described, it will be seen that when the shaft 28 is turned, and the head 43 of the piston 40 moves into position passing the abutment, the piston 41 will have moved so as to compress the previously inspired charge and forced the same through the adjacent abutment 52 through the port 91 past the valve 84 and into the pockets 80 and 78, through the port 81. The commutator may be arranged to cause ignition of this charge as soon as the head of the piston 40 has passed beyond the abutment a short distance, so that the explosion will propel the piston 40 and thus continue the operation of the engine. After the engine has obtained momentum, the lever 97 may be moved to advance the timing of the spark relatively to the movement of the shaft 28 so that the ignition will begin slightly before the head of the piston 40 has passed the adjacent abutment, and the charge will have developed the maximum energy when the abutment moves to bring the pocket 80 into communication with the chamber 16. The valve 84 will prevent back firing of any charge into the compressor or the passages there adjacent, as will be readily understood. By reason of the large passages in which the ignited charge is retained, it will exert sustained energy upon the piston 40 for a considerable period of time, relatively, in combustion engines.

What is claimed:

1. An engine of the character described comprising a casing having coaxial engine and compressor piston chambers and coaxial abutment chambers concentric shafts in the last named chambers stopping short of each other bored at their inner ends to form gas passages and ported within the respective chambers the inner end of the shaft adjacent the engine chamber having a valve seat thereon, a valve reciprocable between the two shafts, having a stem slidably mounted in the outer end of the seat shaft and resilient means engaged with the stem tending to seat the valve, a space of greater diameter than the valve being formed in the casing between the shafts.

2. In an engine of the character described, a casing having a cylindrical abutment chamber, an abutment revoluble therein having a spherical element at one side a passage being formed in the casing having a spherical element reciprocable therein, a helical spring having terminal coils of less diameter than and engaged respectively upon the spherical elements, and means to adjust the spherical element in said passage.

3. In an engine of the kind described an engine and compressor casing combined comprising two castings having alined cylindrical chambers open on the outer sides and having integral inner walls closing the inner sides of said chambers, bearing sleeves formed on and projected rearwardly from said walls, and flanges at the outer side of said castings, said sleeves and flanges being finished for snug opposing abutment, said castings having cored passages opening inwardly of said flanges on the inner and front sides of the castings, and plates having bearing portions alined with said sleeves, and cored passages opening for communication with the first named passages, means to secure the castings and plates together and water connections for said passages.

In testimony whereof I have affixed my signature in presence of two witnesses.

FRANK MARION.

Witnesses:
WILLIAM H. TAYLOR,
OSCAR L. SHEPARD.